United States Patent [19]

Horowitz et al.

[11] 3,755,622

[45] Aug. 28, 1973

[54] FILM SCANNING SYSTEM HAVING IMPROVED VERTICAL STABILITY

[75] Inventors: Harvey M. Horowitz, Easton; Renville H. McMann, Jr., New Canaan, both of Conn.

[73] Assignee: Columbia Broadcasting System, Inc., New York, N.Y.

[22] Filed: Nov. 22, 1971

[21] Appl. No.: 200,786

[52] U.S. Cl. ............. 178/7.2, 178/DIG. 28, 352/21, 352/180

[51] Int. Cl. ...... G11b 15/52, H04n 5/36, H04n 5/86

[58] Field of Search ................ 178/DIG. 28, 69.5 G, 178/6.6 P, 7.2; 352/180, 21

[56] References Cited

UNITED STATES PATENTS

| | | | |
|---|---|---|---|
| 3,234,326 | 2/1966 | Goldmark | 178/DIG. 28 |
| 3,288,920 | 11/1966 | Baracket | 178/69.5 G |
| 3,604,850 | 9/1971 | Eckenbrecht | 178/DIG. 28 |
| 3,390,231 | 6/1968 | Youngquist | 178/6.6 P |
| 2,912,487 | 11/1959 | Horsley | 178/DIG. 28 |

*Primary Examiner*—Howard W. Britton
*Attorney*—Spencer E. Olson

[57] ABSTRACT

An electronic film scanning system dynamically compensated for the effects of instabilities caused by variable film speed, and/or variations in spacing between successive film frames and associated sync marks. Sync information derived from the film in phase-locked to a reference by a film transport servo drive, and a compensation signal proportional to the dynamic phase error of the servo is produced to maintain the alignment between a scanning raster and film frame position.

7 Claims, 10 Drawing Figures

FILM SCANNING SYSTEM HAVING IMPROVED VERTICAL STABILITY

FIELD OF THE INVENTION

This invention relates to electronic systems for the reproduction of information recorded on photographic film and more particularly a system having improved vertical stability in a reproduced video display.

BACKGROUND OF THE INVENTION

Information recorded in a succession of frames on a photographic film which may contain pictorial or other data is often scanned electronically such as by a flying spot scanner to provide an electrical output signal representative of scanned information and which can be reproduced on a display such as a television receiver. A particularly effective system for recording picture information on photographic film is known as electronic video recording (EVR), wherein picture information is recorded in successive frames much as a movie film, and a television picture reproduced from this film by means of electronic scanning and processing of resulting video signals. Both monochrome and color pictures can be recorded and reproduced by electronic video recording techniques.

In the case of monochrome pictures, the film contains a picture track comprising a succession of photographic frames with a sound track disposed along the film. For color recording, two picture tracks are provided along the film, one track being a luminance track comprising a succession of monochrome frames, the other track being a color track containing frames of encoded chroma information. In both monochrome and color recording, a synchronization track is provided along the film and generally includes an aperture in alignment with each frame from which synchronization signals are derived. To reproduce the recorded picture information, the recorded frames are each scanned in a raster pattern compatible with a conventional television receiver, and a video signal generated to cause display of the scanned picture on the television receiver. Such EVR systems can produce stable pictures when a high quality film is transported at a constant velocity past the electronic scanner. However, deficiencies in the quality of the film and variations in the scanner can cause noticeable vertical jitter in a displayed picture. Vertical jitter can be caused, for example, by variations in the velocity of the moving film or from nonuniform spacing of the recorded frames and associated synchronization marks on the film.

Techniques have been proposed heretofore for compensating for vertical jitter by deriving a correction signal from the synchronization track on the film. Representative of prior art techniques for jitter compensation is that shown in U.S. Pat. No. 2,890,277 wherein the sprocket holes of a film are employed as synchronization marks and from which are produced reference or synchronization (sync) signals which are compared with vertical drive pulses for the deflection circuit of the film scanner. An error signal representative of the difference between the sync and vertical drive pulses is provided for repositioning the scanning raster in relation to the film frames to minimize jitter. This technique does not, however, permit effective jitter compensation. The error signal is derived by comparing the time of occurrence of a sync pulse with that of the vertical drive pulse. In essence, a phase comparison is made between the pulses and it will be appreciated that the average frequency of the pulses derived from the sprocket holes must be the same as that of the vertical drive pulses for appropriate phase comparison to be made. The system of the above patent does not include means for providing a common average frequency and thus the error signal which is produced does not accurately represent the true phase difference between the sync and drive pulses. As a result, the raster cannot be accurately repositioned.

The accuracy of the error signal is also limited by dependence upon the particular waveform of the pulses derived from the sprocket holes. These pulses are provided in response to light reflected from the edge portion of the film containing the sprocket holes, and each pulse so produced has a sloped leading and trailing edge caused by the passing sprocket hole, the particular waveform of each pulse being important to the phase comparison process. In practice, variations in the intensity of light impinging on the sprocket hole track, variations in photocell sensitivity, as well as variations in the reflectivity of the film surface do not allow the maintenance of a precise waveform of the sync pulses. Accurate and repeatable pulses cannot therefore be derived from the film sprocket holes to enable truly effective jitter compensation. As a further disadvantage of the system of the above patent, the positional relationship between the sprocket holes and recorded frames is not specified; thus, although the system can provide some correction for variations in sprocket hole spacing, the above-described technique does not compensate for variations in frame spacing which is a major source of vertical jitter.

SUMMARY OF THE INVENTION

In accordance with the present invention, jitter compensation in an electronic video recording system and in other electronic film scanning systems is provided in a manner to minimize instabilities produced by variations in the velocity of the film or from nonuniform spacing of the recorded frames. The position of the scanning raster is adaptively adjusted to conform with the actual position of film frames being scanned which results in an acceptable stationary display of a picture on a television receiver or other display device.

Briefly, the invention provides a dynamic framing circuit operative in response to synchronization pulses derived from a synchronization track on the film being scanned and operative to compare the received synchronization pulses with a reference signal derived from the main power source of the overall system. An error or compensation signal is produced which is representative of the time difference between the received synchronization pulses and the reference signal and is applied to the vertical scanning circuitry of the electronic film scanner to position the raster in alignment with the frame. The raster is positioned during the vertical flyback interval to prevent discontinuity in the displayed picture. The invention also features an improved film transport locked to reference pulses derived from the main power source and which is capable of stable operation even in the presence of synchronization signal timing variations.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
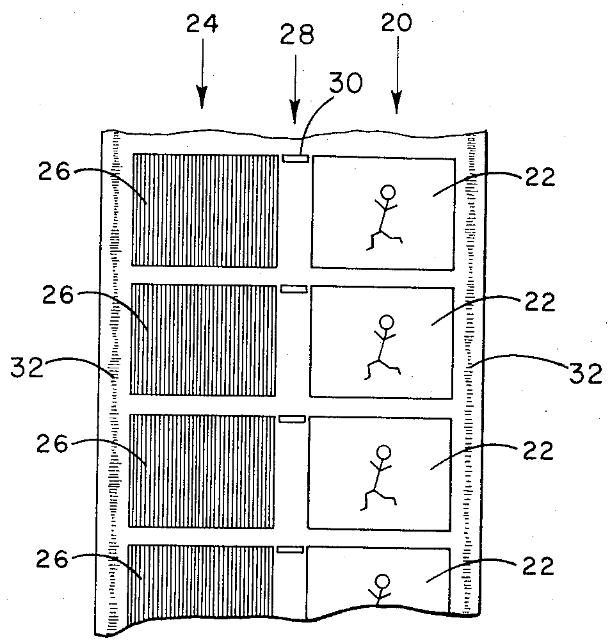
FIG. 1 is a fragmentary plan view of a typical film format for color picture information useful in the invention.

Before considering the operation of a system embodying the invention, it will be useful to consider a typical film format usable therewith. A typical film format for color program material is depicted in FIG. 1 and includes a luminance track 20 comprised of a succession of frames 22 of black and white pictures, and a color track 24 comprised of a succession of encoded frames 26 each associated with a respective frame 22 and each containing encoded chroma information. A sync track 28 is provided on a longitudinal strip intermediate the two successions of frames and includes a plurality of light transmissive apertures 30 each aligned with the upper edges of respective frames 22 and 26. One or more sound tracks 32 are provided along one or both edges of the film to provide monaural or binaural audio information for reproduction along with the picture information. These audio tracks can be of magnetic or photographic form. In order to employ a standard size film format for both monochrome and color picture reproduction, the monochrome film can be produced with two adjacent frames across the width of the film corresponding in position to the frames 22 and 26. The adjacent successions of frames are parts of two separate picture tracks and, thus, two monochrome tracks can be provided on the single film. The sync track 28 is common to both, and an associated sound track can be provided for each picture track, one along each edge.

Figure 2:
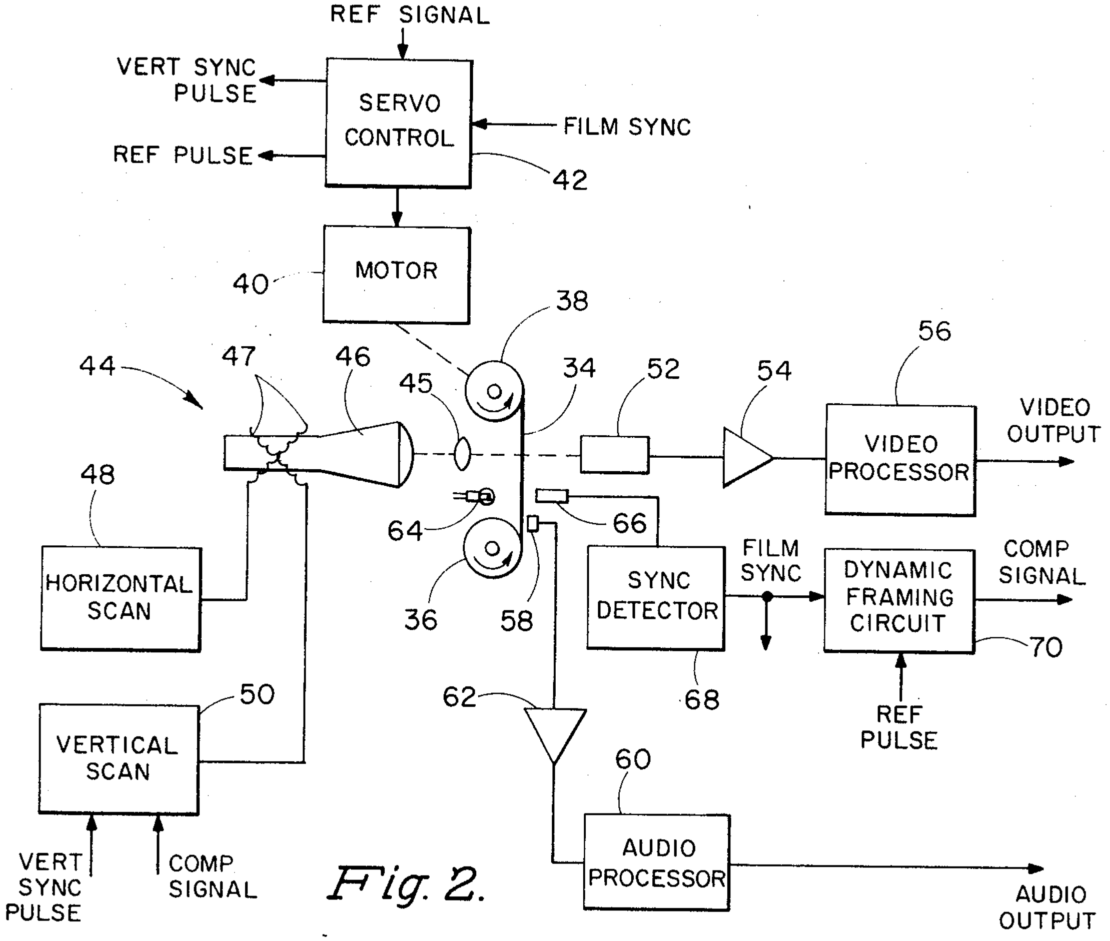
FIG. 2 is a diagrammatic representation of a system for reproducing the film of FIG. 1 and embodying the invention.

Reproducing apparatus for the film described in FIG. 1 (either black and white or color) embodying the present invention is shown in diagrammatic form in FIG. 2 and is operative to electronically scan a continuously moving film of the type described above, and for deriving therefrom video and audio signals for reproduction of the program information recorded on the film. The construction and operation of the EVR system itself, together with a discussion of electronic video recording in general, is described in detail in the *IEEE Spectrum*, September 1970, pages 22 – 33. A brief discussion of the playback system should suffice for present purposes. Referring to FIG. 2, a film 34 which may contain black and white or color program material is carried by a supply reel 36 and takeup reel 38 of a film transport, which includes a drive motor 40 and associated servo control circuitry 42. The film transport is operative to move film 34 continuously at a substantially constant speed past a scanning position where the film is scanned by a flying spot scanner 44 and associated optics 45, the flying spot scanner including a cathode ray tube 46 having horizontal and vertical deflection coils 47 and associated horizontal scan circuitry 48 and vertical scan circuitry 50. The scanner 44 is operative to scan a spot of light across the frames of film 34 in a raster pattern controlled by deflection circuits 48 and 50, in a well known manner.

One or more photodetectors 52 are disposed on the opposite side of film 34 from cathode ray tube 46 to receive light scanned therethrough and to produce output signals representative of the magnitude of light transmitted through the film. The photodetector output signals are amplified by amplifier 54 and applied to a video processor 56 which provides video output signals for application to a television receiver or other utilization means for picture reproduction. In the case of black and white picture material, a single photodetector, such as a photomultiplier tube, is employed to generate video signals. For the color picture format of FIG. 1, two photodetectors are employed, again typically photomultiplier tubes, each operative to sense light scanned across respective frames 22 and 26 to provide respective output signals representing luminance and chrominance information which are then applied to video processor 56 for production of a composite video output signal for application to a television receiver or the like.

Magnetic heads, one of which is shown at 58, are disposed adjacent respective sound tracks of film 34 to provide audio signals via an amplifier 62, to an audio processor 60, the audio processor providing audio output signals for application to utilization apparatus such as a television receiver.

In accordance with the present invention, the scanning raster of the flying spot scanner 44 is dynamically maintained in alignment with the film frames being scanned to substantially minimize the deleterious effects of jitter caused by film speed variations and/or variations in the spacing between film frames. A lamp 64 or other suitable light source is disposed with respect to the sync track on film 34 to transmit light through the apertures thereon, these light pulses being received by a photosensor 66 such as a phototransistor. The electrical output signal of photosensor 66 is applied to a sync detector 68 which provides film sync pulses to a dynamic framing circuit 70 according to the invention, the output signal of which is a correction signal applied to vertical scan circuit 50. Film sync pulses from detector 68 are also applied to servo control circuit 42 of the film transport. A reference signal derived from the A.C. power line (60 Hz in the United States) is applied to the motor servo 42 to lock the sync pulses from the film to the power line frequency. A reference pulse derived from the reference signal is applied to the dynamic framing circuit 70. The vertical scan 50 is also locked to the power line frequency by a vertical sync pulse also derived from the reference signal.

Figure 3:
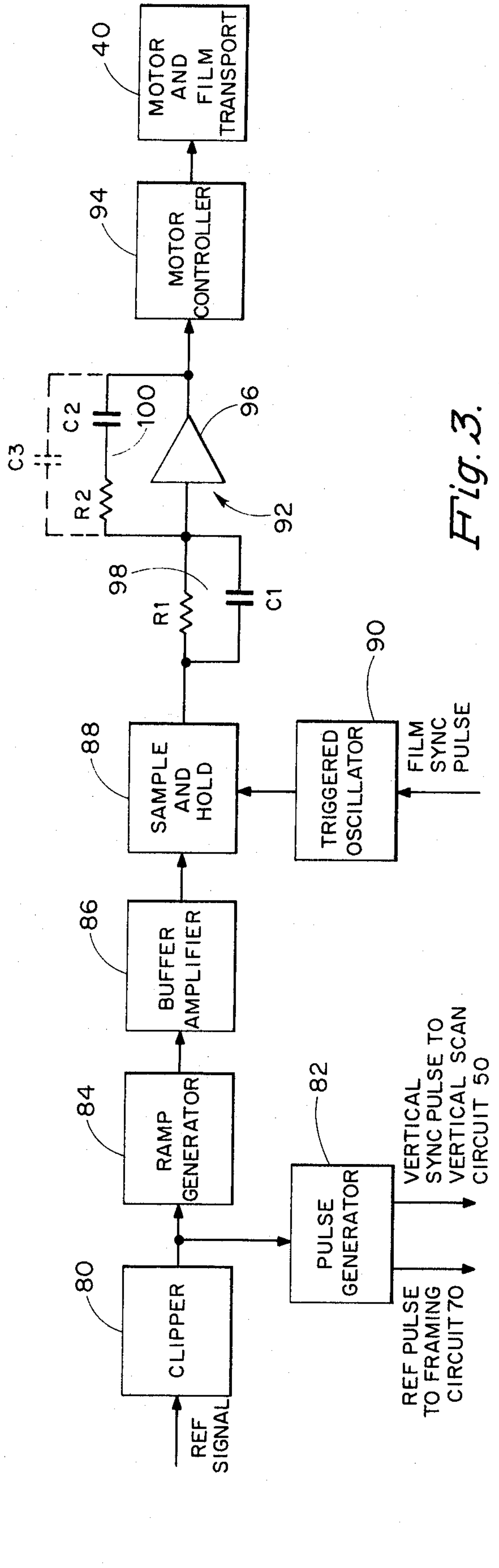
FIG. 3 is a diagrammatic representation of a film transport servo system according to the invention.

The servo control circuitry 42 for motor 40 is depicted in FIG. 3 and includes a clipper circuit 80 to which a reference signal from the 60 Hz power source is applied and which is operative to provide a square wave output signal at the power line frequency. The square wave output signal from clipper 80 is applied to a pulse generator 82 which provides a reference pulse for the dynamic framing circuit 70 and also a vertical sync pulse for the vertical oscillator of vertical scan circuit 50. The output signal from clipper 80 is also applied to a ramp generator 84 the output of which is applied, via a buffer amplifier 86, to a sample and hold circuit 88, which also receives an enable pulse from a triggered oscillator 90, which, in turn, is energized by a film sync pulse from sync detector 68. The output signal from sample and hold circuit 88 is applied to an equalizer network 92 the output of which is applied to motor controller circuit 94 operative to provide energizing signals to motor 40 of the film transport apparatus. The reference pulse and vertical sync pulse are each derived from the 60 Hz power source and establish a predetermined phase relationship between the ramp signal provided by generator 84 and the reference pulse employed for dynamic framing. The reference pulse usually occurs at approximately the midpoint of the ramp since the center transition of the square wave from clipper 80 is employed by pulse generator 82 to produce the reference and sync pulses.

The servo system operates as a phase-locked loop wherein the phase relationship between the film sync pulse and the reference signal is detected by sampling the ramp signal produced by generator 84 at the leading edge of each film sync pulse. The sample level is held by sample and hold circuit 88 for the duration of the sync pulse period and the output of circuit 88 is equalized by equalizer network 92 and applied to motor controller circuit 94 such that the average film sync pulse frequency is maintained at precisely the reference frequency. The equalizer network 92 includes an operational amplifier 96 having a parallel RC input circuit 98 composed of resistor R1 and capacitor C1, and a series RC circuit 100, composed of resistor R2 and capacitor C2, connected between the input and output terminals of amplifier 96. The equalizer functions essentially as an integrator and in co-operation with the overall servo loop is operative to regulate motor speed and to provide enhanced transient response in the presence of sync errors.

Figure 4:
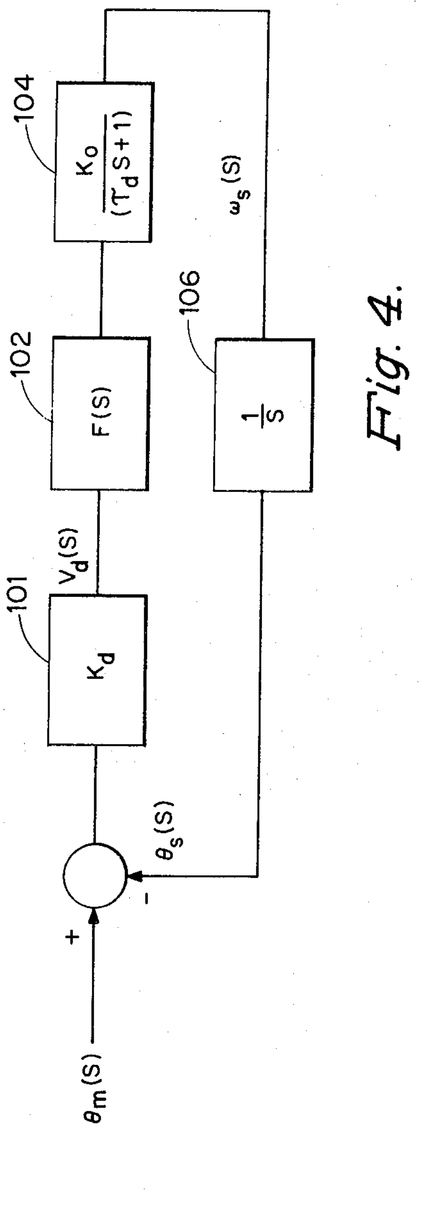
FIG. 4 is an electrical equivalent block diagram of the film transport servo system of FIG. 3 useful in illustrating the operation thereof.

An equivalent block diagram of the servo loop is depicted in FIG. 4. The notations $\theta_m(S)$ and $\theta_s(S)$ respectively represent the phase of the reference and sync signals. The block labeled $K_d$ represents the phase detector gain factor. The block 102 labeled F(S) represents the equalizer transfer function, while block 104 represents the transfer function of the film transport mechanism. The block 106 represents the integration relating phase, $\theta_s(S)$, with frequency, $\omega_s(S)$.

The transfer function of the film transport mechanism can be represented by $$\omega_s(S)=K_oV_c(S)/(\tau_dS+1) \quad (1)$$

where $\omega_s = 2\pi f_s$ $f_s$ = film sync pulse frequency $V_c(S)$ = control voltage input to motor control circuit $\tau_d$ = R1C1 = time constant of film transport drive $K_o$ = control sensitivity $\omega_s(S)$ = Laplace transform of $\omega_s(t)$ The equalizer network 92 is specified by $$F(S) = (R1C1S+1)\ (R2C2S+1)/R1C2S \quad (2)$$

By well known mathematical manipulation, the overall response of the servo loop of FIG. 4 can be set forth as $$\theta_s(S)/\theta_m(S) = (2\phi\omega_nS+\omega_n^2)/(S^2+2\phi\omega_nS+\omega_n^2) \quad (3)$$

where $\omega_n = (K_oK_d/\tau_1)^{1/2}$ = natural frequency of loop $\phi = (\tau_2/2)\ \omega_n$ = damping factor $\tau_1$ = R1C2

$\tau_2$ = R2C2

Equation (3) will be recognized as the classical second order response function of a phase-locked loop and its features are per se known to those versed in the art. In the present system, in order to permit the dynamic framing circuitry to cancel the dynamic phase error of the loop, the natural frequency of the loop should be as low as possible consistent with required pull-in time. Satisfactory performance is obtained when $\omega_n$ is equal to 2 $\pi$ radians per second, and the damping factor, $\phi$, is equal to one. To limit the high frequency gain and to prevent oscillation of the equalizer, a capacitor C3 (FIG. 3) can be added across the feedback network to introduce a breakpoint in the frequency response of the network, but this breakpoint occurs at a much higher frequency than the servo bandwidth and thus has no effect on servo behavior. A servo loop constructed in accordance with the specifications set forth above results in a high DC loop gain which achieves a negligible static phase error such that the average phase relationship between the film sync pulse and the reference signal remains constant.

Figure 5:
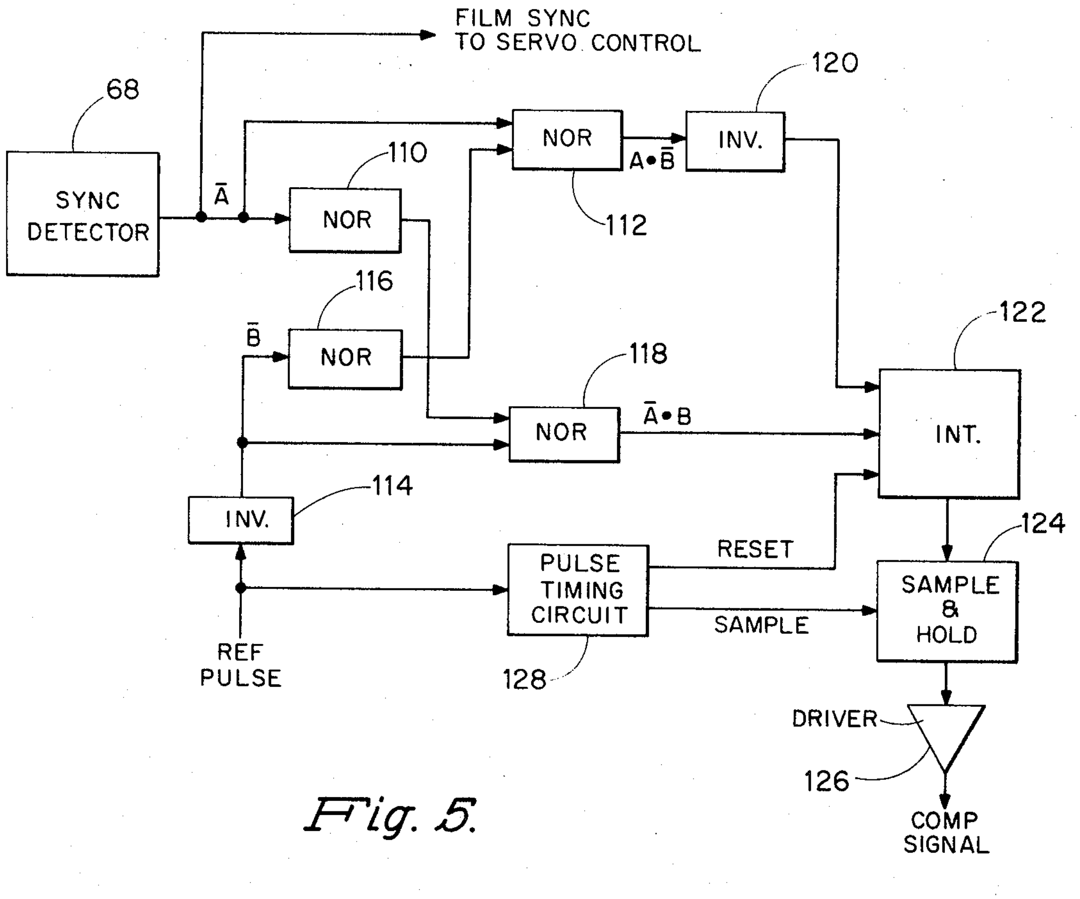
FIG. 5 is a diagrammatic representation of a dynamic framing circuit according to the invention.

The dynamic framing circuit 70 of FIG. 2 is depicted in greater detail in FIG. 5. The film sync pulses from sync detector 68 are applied to a pair of NOR gates 110 and 112. The reference pulse provided by pulse generator 82 (FIG. 3) is applied via an inverter 114 to a second pair of NOR gates 116 and 118. The output of gate 110 is applied to an input of gate 118, while the output of gate 116 is coupled to an input of gate 112. The output of gate 112 is applied via an inverter 120 to an input of an integrator 122 which also receives as an input the output signal from gate 118. The output of integrator 122 is applied to a sample and hold circuit 124 the output of which is applied to a driver 126. Driver 126 provides a compensation signal to the deflection circuit of cathode ray tube 46 of the flying spot scanner to adjust the position of the scanning raster. The reference pulse is also applied to a timing circuit 128 which provides a reset pulse to integrator 122 and a sample pulse to circuit 124.

The signal applied to gate 110 is labeled $\bar{A}$ while the signal applied to gate 116 is labeled $\bar{B}$. Inspection of the operation of the interconnected gates 110, 112, 116 and 118 reveals that the output of gate 112 specifies the logical function $A.\bar{B}$, while the output of gate 118 specifies the function $\bar{A}.B$. A equals one during a film sync pulse and B equals one during a reference pulse. A equals zero when there is no sync pulse and B equals zero when there is no reference pulse. The output signal of gate 112 ($A.\bar{B}$) is high when the film sync pulse leads the reference pulse, while the output signal from gate 118 ($\bar{A}.B$) is high when the film sync pulse lags the reference pulse. The output from both gates 112 and 118 are low (zero) when both pulses are present in time coincidence.

Figure 6:
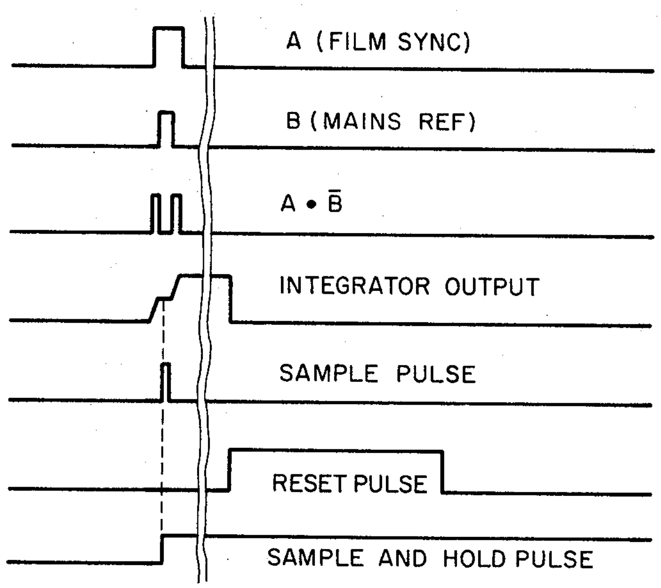
FIG. 6 is a signal diagram illustrating operation of the dynamic framing circuit when the film synchronization pulses lead the reference signal.

In the event that the film sync pulse leads the reference pulse, the resulting signal conditions are as shown in FIG. 6. The integrator 122 generates a positive-going ramp starting at the leading edge of the film sync pulse and continuing for the duration of time that the film sync pulse leads the reference pulse. When the reference pulse commences, the output of the integrator holds at the ramp level reached when the reference pulse occurred so that the integrator output signal is higher than the integrator reference level by an amount proportional to the time interval between the leading edge of the film sync pulse and the leading edge of the reference pulse. The output of the integrator is sampled by a sample pulse from timing circuit 128 at a time corresponding to the vertical retrace interval of the flying spot scanner, and the sampled level is stored by sample and hold circuit 124 for the duration of the film scanning interval. The output of the sample and hold circuit applies a signal to driver 126 which, in turn, applies a compensation signal to the vertical deflection circuit of the cathode ray tube to align the raster pattern with the frame being scanned and thereby prevent discontinuity in the displayed picture. The integrator 122 is reset by a pulse from timing circuit 128 to its reference level during the active frame scanning period so that the compensation process can be repeated for the next received film sync pulse.

Figure 7:
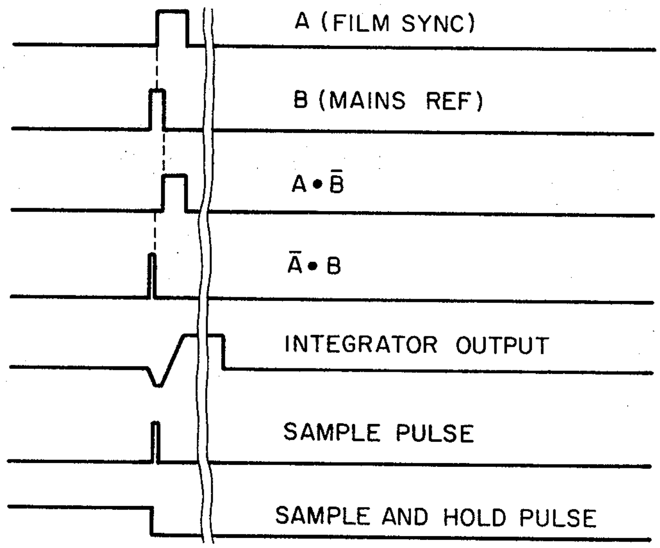
FIG. 7 is a signal diagram illustrating operation of the dynamic framing circuit when the film synchronization pulses lag the reference signal.

If the film sync pulse lags the reference pulse, the signal conditions are as depicted in FIG. 7. The integrator generates a negative-going ramp starting at the leading edge of the reference pulse and continuing until arrival of the leading edge of the film sync pulse. At the leading edge of the film sync pulse the integrator output remains at a level lower than the zero reference level by an amount proportional to the time interval between the leading edge of the reference pulse and that of the film sync pulse. The sample pulse causes storage of the integrator output level by sample and hold circuit 124, the output therefrom being a signal to driver 126 which applies a deflection compensation signal to the vertical deflection circuit of the cathode ray tube to alter the position of the raster pattern accordingly.

Figure 8:
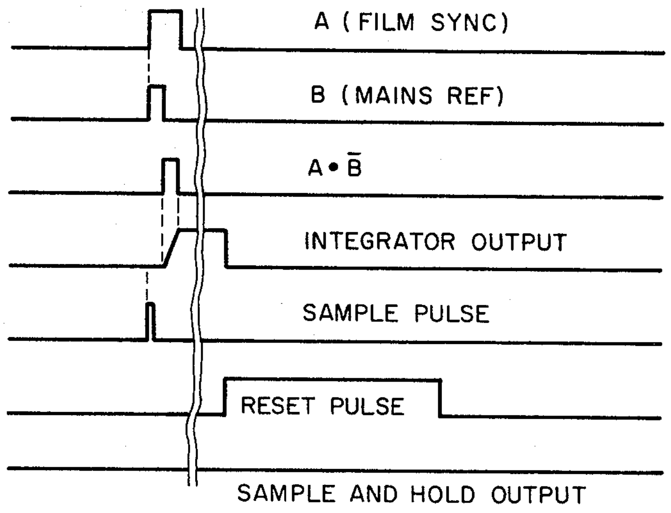
FIG. 8 is a signal diagram illustrating operation of the dynamic framing circuit when the film synchronization pulses are coincident with the reference signal.

If the film sync pulse is coincident with the reference pulse, the signals of the framing circuit are as depicted in FIG. 8. A sample pulse from timing circuit 124 is provided during the duration of the reference pulse to sample and hold circuit 124. Integrator 122 remains at a constant reference level during the time of coincidence between the film sync pulse and the reference pulse and provides no compensating signal to the deflection circuit. The sample and hold circuit 124 is operative upon the occurrence of the sample pulse to store a potential representative of a zero compensation signal for the deflection circuit for the illustrated condition of coincidence between the film sync and reference pulses. The raster pattern scanned by scanner 44 (FIG. 2) thus continues in normal fashion, no compensation being required to correct the alignment between the raster pattern and the scanned film frame.

Because of the logic used, and the difference in width of the reference and sync pulses, the integrator output in each of the described cases will rise in the time interval between the trailing edge of the reference pulse and the trailing edge of the sync pulse. However, this occurs after the sample relating the time difference between the leading edges has been taken and consequently has no bearing on the operation of the system.

The gain of driver 126 is adjusted to cause the raster to move proportionally with the time difference between the film sync pulse and the reference pulse, thereby to precisely align the raster with the film frame being scanned. The compensation signal from driver 126 can be applied as a centering current to the vertical scan circuit 50 or, alternatively, can be applied to an auxiliary deflection coil or yoke provided around cathode ray tube 46. Movement of the scanning raster should be accomplished without defocusing or distortion of the raster geometry; thus, the auxiliary deflection yoke must generate a uniform strength magnetic field across the path of electron beam flow. Typically, a square toroidal yoke configuration provides the intended uniform field, the yoke being installed around the neck of the cathode ray tube approximately midway between the focus magnet and the centering magnets.

Figure 9:
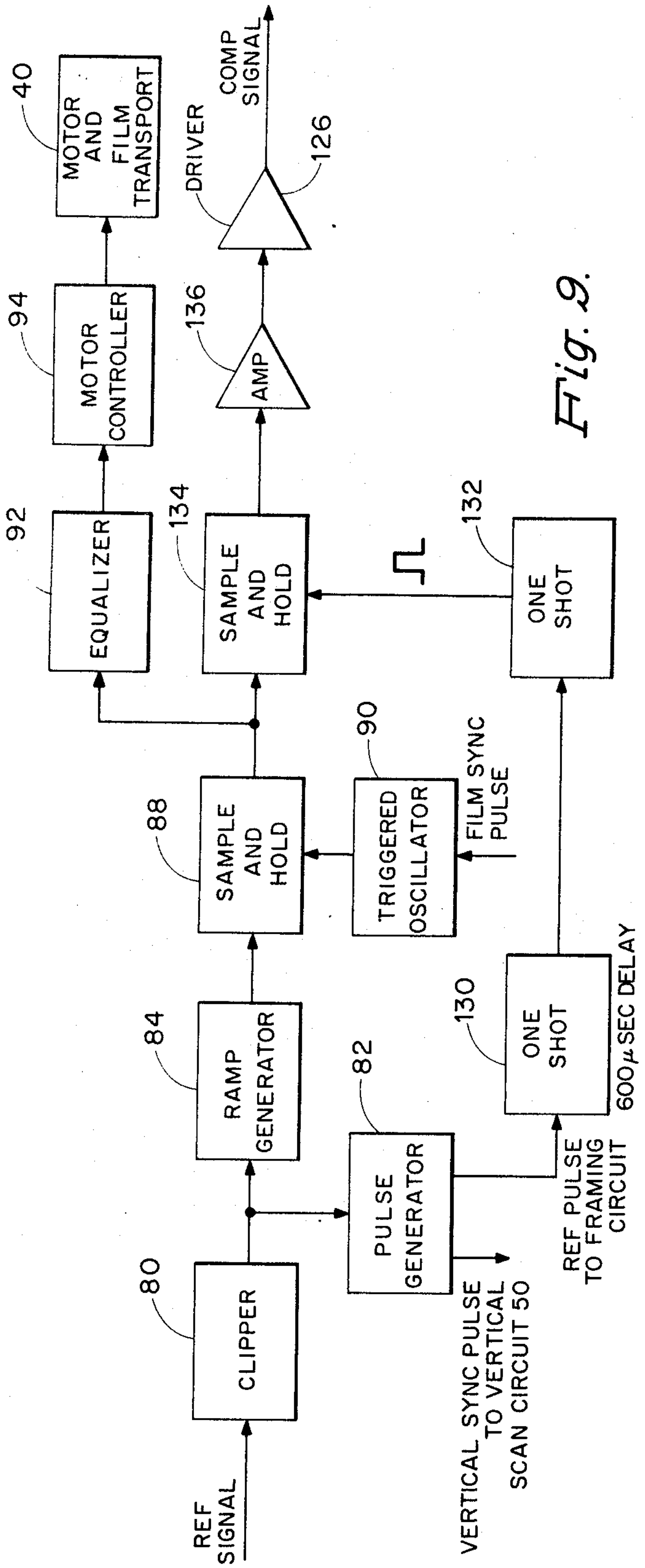
FIG. 9 is a diagrammatic representation of an alternative embodiment of the invention.

An alternative embodiment of the invention is shown in FIG. 9 wherein the compensation signal is provided by a modified version of the servo control circuitry described above, without necessity for a separate phase detector circuit. The servo control for the motor and film transport 40 is identical to the system of FIG. 3 and like constituent elements bear the same reference numbers. As described, a reference signal from the 60 Hz power line is applied to clipper circuit 80 which produces a square wave signal for initiating the generation of a ramp voltage by ramp generator 84, the amplitude of which is sampled upon the presence of a sync pulse derived from the film and applied to sample and hold circuit 88 by triggered oscillator 90. The sample voltage from sample and hold circuit 88 is applied to an equalizer 92, the output of which is applied to motor controller 94 for governing operation of the motor and film transport 40.

The sample voltage from sample and hold circuit 88 is also applied to another sample and hold circuit 134, the output of which, in turn, applies a compensation signal to the vertical scan circuit 50 to align the raster pattern with the frame being scanned. The information at the output of sample and hold circuit 88 is identical in nature to the output from sample and hold circuit 124 of the dynamic framing circuit of FIG. 5, described above. The sample and hold circuit 134 is provided to transfer information from circuit 88 to driver 126 for application to vertical scan circuit 50 during the flyback period. In the illustrated embodiment, the reference pulse from pulse generator 82 is applied to a one shot multivibrator 130 which provides a predetermined time delay, typically 600 microseconds, after which a second one shot multivibrator 132 is energized to apply a sample pulse to sample and hold circuit 134.

Figure 10:
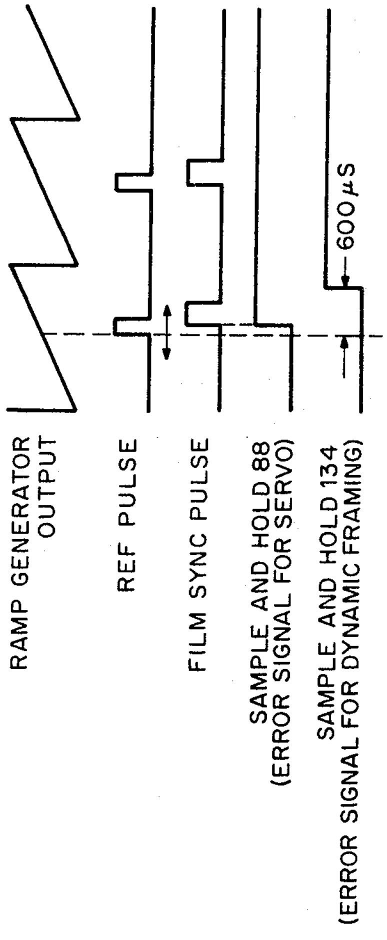
FIG. 10 is a signal diagram illustrating operation of the embodiment of FIG. 9.

The signal conditions of the circuit of FIG. 9 are illustrated in FIG. 10. Each reference pulse occurs at approximately the midpoint of the ramp. A film sync pulse occurs at a time which may be coincident or which may lead or lag the reference pulse depending upon instantaneous variations in frame spacing and/or film velocity. The error signal from the servo system is provided by the output signal from sample and hold circuit 88, while the error signal for dynamic framing is provided by the output signal from sample and hold circuit 134, which occurs 600 microseconds after the occurrence of the reference pulse. Referring again to FIG. 9, the error signal from sample and hold circuit 134 is amplified by amplifier 136 and applied to driver 126 which generates a compensation signal for application to vertical scan circuit 50. The compensation signal is of the same level as in the embodiment of FIG. 5 to cause the raster of the film scanner to move proportionally with the time difference between the film sync pulse and the reference pulse. The raster pattern is thereby accurately aligned with the film frame being scanned.

From the foregoing, it should be evident that the invention provides an electronic scanning system dynamically compensated for the effects of jitter caused by variations in film speed and variations in spacing between successive frames of a film being scanned. Various modifications and alternative implementations will now occur to those versed in the art. Accordingly, it is not intended to limit the invention by what has been particularly shown and described except as indicated in the appended claims.

What is claimed is:

1. An electronic film scanning system comprising:

film transport apparatus for conveying a photographic film at a substantially uniform rate past a scanning position said film having a succession of data bearing frames along the length thereof and a plurality of synchronization marks along the length thereof, there being a single synchronization mark associated with each frame;

electronic scanning means operative to scan in a predetermined pattern each of said frames of said film as said film is conveyed past a scanning position;

photodetector means for sensing light from said electronic scanning means transmitted by said scanned film frames and for providing an electrical signal in response thereto;

video processing means operative in response to said electrical signal to provide an output signal representative of data contained in said scanned film frames;

means for sensing said synchronization marks on said film and for providing output indications thereof;

means for providing film synchronization pulses in response to said output indications;

means for providing a reference signal at the power line frequency of said system;

a dynamic framing circuit operative in response to said film synchronization pulses and said reference signal to produce a compensation signal for each frame, said compensation signal being representative of the time difference between said film synchronization pulses and said reference signal;

means for applying said compensation signal to said electronic scanning means during each entire frame to maintain alignment between the scanning pattern of said scanning means and the scanned film frames; and servo control means coupled to said film transport apparatus and operative in response to the difference in phase between said film synchronization pulses and said reference signal to cause said film to be moved at a velocity at which said film synchronization pulses are phase-locked to the power line frequency.

2. The invention according to claim 1 wherein said servo control means includes:

means for deriving reference pulses from said reference signal; and means operative in response to said reference signal and said film synchronization pulses to provide an error signal representative of the time difference between said film synchronization pulses and said reference signal.

3. The invention according to claim 1 wherein said servo control means includes:

means operative in response to said reference signal for providing a square wave signal at said power line frequency;

means operative in response to said square wave signal to provide a ramp signal;

means for storing a representation of the voltage of said ramp signal at the time of occurrence of each of said film synchronization pulses; and means for deriving a first error signal from said stored voltage representation to cause said film to be moved at a velocity at which said film synchronization pulses are phase-locked to the power line frequency;

and wherein said dynamic framing circuit includes:

means for storing said representation of the voltage of said ramp signal;

means for delaying said reference pulses by a predetermined amount;

means for deriving a second error signal from said stored voltage representation at the end of said delay interval; and means for producing said compensation signal in response to said second error signal.

4. The invention according to claim 1 wherein said dynamic framing circuit includes:

a plurality of logic gates operative to receive said film synchronization pulses and said reference pulses and operative to provide a first output signal when said film synchronization pulses lead said reference pulses, to provide a second output signal when said film synchronization pulses lag said reference pulses and to provide both said first and second output signals when said film synchronization pulses and said reference pulses are in time coincidence;

means for providing a voltage representative of the difference in the time of occurrence of said film synchronization pulses and said reference pulses; and means for producing said compensation signal in response to said representative voltage.

5. In an electronic film scanning system having a photographic film containing a succession of frames of data along the length thereof, a film transport for moving said film at a substantially uniform rate past a scanning position, an electronic scanner for scanning each of said frames at said scanning position, and means for deriving an output signal representative of data contained in said scanned film frames, means for dynamically compensating for the effect of instability in said system and comprising:

means for driving synchronization pulses from said film;

means for providing a reference signal at the power line frequency of said system;

means for deriving from said reference signal reference and vertical synchronization pulses at the frequency of said reference signal;

a dynamic framing circuit operative in response to the difference in the time of occurrence of said film synchronization pulses and said reference pulses to produce a compensation signal for said electronic scanner to maintain alignment between the scanning pattern of said scanner and film frames being scanned, said dynamic framing circuit including a. means for applying said film synchronization pulses to first and second gates;

b. means for applying said reference pulses to third and fourth gates;

c. means for applying the output of said first gate to the input of said fourth gate;

d. means for applying the output of said third gate to the input of said second gate;

e. an integrator operative to combine the signals received from said second and fourth gates;

f. a sample and hold circuit operative to receive an output signal from said integrator;

g. means for applying a sample signal derived from said reference pulses to said sample and hold circuit to cause storage of a voltage level related to said time difference; and h. means for producing said compensation signal in response to said stored voltage level; and servo control means coupled to said film transport and operative in response to the difference in phase between said film synchronization pulses and said reference signal to cause said film to be moved at a velocity at which said film synchronization pulses are phase-locked to the power line frequency.

6. An electronic film scanning system comprising:

film transport apparatus for conveying a photographic film at a substantially uniform rate past a scanning position, said film having a succession of data bearing frames along the length thereof and a plurality of synchronization marks along the length thereof;

electronic scanning means operative to scan in a predetermined pattern each of said frames of said film as said film is conveyed past a scanning position;

photodetector means for sensing light from said electronic scanning means transmitted by said scanned film frames and for providing an electrical signal in response thereto;

video processing means operative in response to said electrical signal to provide an output signal representative of data contained in said scanned film frames;

means for sensing said synchronization marks on said film and for providing output indicatiots thereof;

means for providing film synchronization pulses in response to said output indications;

means for providing a reference signal at the power line frequency of said system;

a dynamic framing circuit operative in response to said film synchronization pulses and said reference signal to produce a compensation signal representative of the time difference between said film synchronization pulses and said reference signal;

means for applying said compensation signal to said electronic scanning means to maintain alignment between the scanning pattern of said scanning means and the scanned film frame; and servo control means coupled to said film transport apparatus and operative in response to the difference in phase between said film synchronization pulses and said reference signal to cause said film to be moved at a velocity at which said film synchronization pulses are phase-locked to the power line frequency, said servo control means including a. means operative in response to said reference signal for providing a square wave signal at said power line frequency;

b. means operative in response to said square wave signal to provide a ramp signal;

c. means for storing a representation of the voltage of said ramp signal at the time of occurrence of said film synchronization pulses; and d. means for deriving a first error signal from said stored voltage representation to cause said film to be moved at a velocity at which said film synchronization pulses are phase-locked to the power line frequency;

said dynamic framing circuit including e. means for storing said representation of the voltage of said ramp signal;

f. means for delaying said reference pulses by a predetermined amount;

g. means for deriving a second error signal from said stored voltage representation at the end of said delay interval; and h. means for producing said compensation signal in response to said second error signal.

7. An electronic film scanning system comprising:

film transport apparatus for conveying a photographic film at a substantially uniform rate past a scanning position said film having a succession of data bearing frames along the length thereof and a plurality of synchronization marks along the length thereof;

electronic scanning means operative to scan in a predetermined pattern each of said frames of said film as said film is conveyed past a scanning position;

photodetector means for sensing light from said electronic scanning means transmitted by said scanned film frames and for providing an electrical signal in response thereto;

video processing means operative in response to said electrical signal to provide an output signal representative of data contained in said scanned film frames;

means for sensing said synchronization marks on said film and for providing output indications thereof;

means for providing film synchronization pulses in response to said output indications;

means for providing a reference signal at the power line frequency of said system;

a dynamic framing circuit operative in response to said film synchronization pulses and said reference signal to produce a compensation signal representative of the time difference between said film synchronization pulses and said reference signal, said dynamic framing circuit including a. a plurality of logic gates operative to receive said film synchronziation pulses and said reference pulses and operative to provide a first output signal when said film synchronization pulses lead said reference pulses, to provide a second output signal when said film snychronization pulses lag said reference pulses and to provide said first and second output signals when said film synchronization pulses and said reference pulses are in time coincidence;

b. means for providing a voltage representative of the difference in time of occurrence of said film synchronization pulses and said reference pulses; and c. means for producing said compensation signal in response to said representative voltage;

means for applying said compensation signal to said electronic scanning means to maintain alignment between the scanning pattern of said scanning means and the scanned film frames; and servo control means coupled to said film transport apparatus and operative in response to the difference in phase between said film synchronization pulses and said reference signals to cause said film to be moved at a velocity at which said film synchronization pulses are phase-locked to the power line frequency.

* * * * *